United States Patent
Fung et al.

(10) Patent No.: US 6,897,179 B2
(45) Date of Patent: May 24, 2005

(54) METHOD OF PROTECTING SAPO MOLECULAR SIEVE FROM LOSS OF CATALYTIC ACTIVITY

(75) Inventors: Shun Chong Fung, Bridgewater, NJ (US); Stephen Neil Vaughn, Kingwood, TX (US); Marcel Johannes Janssen, Kessel-Lo (BE); Luc Roger Marc Martens, Meise (BE); Kenneth Ray Clem, Humble, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 10/461,621

(22) Filed: Jun. 13, 2003

(65) Prior Publication Data

US 2004/0254068 A1 Dec. 16, 2004

(51) Int. Cl.[7] .......................... B01J 27/18; B01J 27/182
(52) U.S. Cl. ........................ 502/208; 502/214
(58) Field of Search .................. 502/208, 214

(56) References Cited

U.S. PATENT DOCUMENTS

| | | | |
|---|---|---|---|
| 4,764,269 A | 8/1988 | Edwards et al. | 208/120 |
| 5,185,310 A | 2/1993 | Degnan et al. | 502/214 |
| 5,248,647 A | 9/1993 | Barger | 502/214 |
| 5,663,471 A | 9/1997 | Kvisle et al. | 585/639 |
| 6,225,254 B1 | 5/2001 | Janssen et al. | 502/214 |
| 6,245,703 B1 | 6/2001 | Kuechler et al. | 502/22 |
| 6,316,683 B1 | 11/2001 | Janssen et al. | 585/640 |
| 6,440,894 B1 | 8/2002 | Martens et al. | |
| 6,441,261 B1 | 8/2002 | Kuechler et al. | 585/639 |
| 6,503,863 B2 | 1/2003 | Fung et al. | 502/214 |

FOREIGN PATENT DOCUMENTS

| WO | WO00/74848 | 12/2000 |
|---|---|---|

OTHER PUBLICATIONS

Briend et al., "Influence of th eChoice of Template on the Short–and–Long–Term Stability of SAPO Zeolite," *J. Phys. Chem.*, vol. 99, pp. 8270–8276, (1995), no month.

Simonot–Grange et al., "Contribution to the Study of Framework Modification of SAPO–34 and SAPO–37 upon water Adsorption by Thermgravimetry," *Thermchimica Acta*, vol. 329, pp. 77–82, (1999), no month.

Mees et al., "Improvement of the Hydrothermal Stability of SAPO–34," *Chem. Commun.*, vol. 1, pp. 44–45, (2003), no month.

Briend, M., et al., "Thermal and Hydrothermal Stability of SAPO–5 and SAPO–37 Molecular Sieves", Journal of the Chemical Society, Dalton Transactions, Chemical Society, Letschworth, GB, No. 7, Jul. 1989, pp. 1361–1362.

*Primary Examiner*—Elizabeth D. Wood (57) ABSTRACT

Disclosed is a method of protecting the loss of catalytic activity of metalloaluminophosphate molecular sieve, particularly a SAPO molecular sieve, from contact with moisture. The method involves heating the metalloaluminophosphate molecular sieve so as to remove template, and provide a molecular sieve in sufficiently dry form for storage.

75 Claims, 1 Drawing Sheet

METHOD OF PROTECTING SAPO MOLECULAR SIEVE FROM LOSS OF CATALYTIC ACTIVITY

FIELD OF THE INVENTION

This invention relates to a method of protecting the catalytic activity of a metalloaluminophosphate molecular sieve. In particular, this invention relates to a method of protecting the catalytic activity of a SAPO molecular sieve by appropriately activating the molecular sieve, preferably during the manufacturing process.

BACKGROUND OF THE INVENTION

Metalloaluminophosphate molecular sieves contain a pore system that is essentially a network of uniform pores and empty cavities connected to one another inside a crystalline or semi-crystalline molecular structure. These pores and cavities catch molecules within the molecular structure. The molecules that are caught have a size equal to or less than the size of the pores and cavities. Molecules of a larger size cannot physically enter into the molecular structure.

The pores and cavities of metalloaluminophosphate molecular sieves are formed as a result of using template materials in the molecular sieve manufacturing process. During the formation of the molecular sieves themselves, a lattice type chemical structure is formed from the alumina, silica or phosphorous components that are used in making the metalloaluminophosphate molecular sieves. This lattice type structure essentially wraps around the template material, with the template material acting as a means of forming the pore structure within the molecular sieve. The resulting molecular sieve may be combined with other components for the benefit of adjusting various properties of the molecular sieve or to form larger particles.

To make the molecular sieve suitable for use, the template must be removed so that the pores and cavities are open to catch molecules, either for the purpose of adsorbing the molecules from the environment or to react the molecules to form a desired product. The reaction occurs when the molecules come into contact with catalytic sites located within the pore system, particularly within one or more of the empty cavities or cages as sometimes called.

The template is conventionally removed from the molecular sieve by calcining or burning out the template. An elution process can also be used to remove the template, although calcination is preferred. Once the template is removed, the molecular sieve is considered to be activated or ready for use. The activated molecular sieve has its pore system, including the empty cavities or cages open to the immediate environment, and ready for use.

Activated metalloaluminophosphate molecular sieves, particularly silicoaluminophosphate (SAPO) molecular sieves, that have catalytic sites within their microporous structure have been found to be especially sensitive to moisture. In general, significant exposure of the activated molecular sieves to moisture has been found to deactivate the catalytic activity of SAPO molecular sieves. Unfortunately, methods of protecting activated SAPO molecular sieves against the harmful effects of moisture are limited.

U.S. Pat. No. 6,316,683 B1 (Janssen et al.) discloses a method of protecting catalytic activity of a SAPO molecular sieve by shielding the internal active sites of the molecular sieve from contact with moisture. The template itself can serve as the shield, or an anhydrous blanket can serve as a shield for an activated sieve that does not include template. It is desirable to shield the active sites, because activated SAPO molecular sieves will exhibit a loss of catalytic activity when exposed to moisture.

U.S. Pat. No. 4,764,269 (Edwards et al.) discloses a method of protecting SAPO-37 catalyst from deactivating as a result of contact with moisture. The catalyst is maintained under storage conditions such that the organic template component of the molecular sieve is retained in the SAPO-37 molecular sieve, until such time as the catalyst is placed into a catalytic cracking unit. When the catalyst is exposed to the FCC reaction conditions, wherein the reactor is operated at 400° to 600° C. and the regenerator operated at about 600° to 850° C., the organic template is removed from the molecular sieve pore structure, and the catalyst becomes activated for the cracking of hydrocarbons. According to this procedure, there is little if any contact with moisture.

Mees et al., "Improvement of the Hydrothermal Stability of SAPO-34," *Chem. Commun.*, 2003, (1), 44–45, first published as an advance article on the web Nov. 22, 2002, discloses a method of protecting SAPO-34 molecular sieve, based on a reversible reaction of $NH_3$ with acid sites of the sieve. The method transforms a $H^+$-SAPO-34 into an $NH_4^+$-SAPO-34 in reversible way. The $NH_4^+$-SAPO-34 is said to be able to withstand severe steaming for an extended period of time without loss of structural integrity and acidity.

As new large scale, commercial production facilities that use metalloaluminophosphate molecular sieves in the production process continue to be implemented, protecting the molecular sieves from loss of catalytic activity as a result of contact with moisture continues to become an even greater challenge. Such challenge is particularly of interest in large scale commercial catalytic reaction systems, where the amount of molecular sieve material that is used is several orders of magnitude larger than typical pilot scale facilities. Such large scale systems will typically require at least 10 tons, and up to as much as 500 tons, of molecular sieve to operate efficiently. Accordingly, additional methods of protecting metalloaluminophosphate molecular sieves against loss of catalytic activity are desired.

SUMMARY OF THE INVENTION

In one aspect, this invention provides methods, which assist in the protection of metalloaluminophosphate molecular sieves against loss of catalytic activity. These methods are particularly effective as they are directed toward very early stages of where problems start. In particular, the methods of this invention are particularly useful in that they can be implemented at the manufacturing stage of the molecular sieves. The molecular sieves themselves can be activated for catalytic use, and protected for storing or transporting prior to use. Alternatively, the molecular sieves can be formulated into a preformed catalyst. The preformed catalyst can be activated to form an activated catalyst, and activated catalyst is protected from catalytic deactivation. The activated catalyst form is a preferred embodiment, since it generally provides the most effective particle size and hardness for commercial scale equipment.

In one embodiment, the invention provides a method of protecting activated metalloaluminophosphate molecular sieve from catalytic deactivation due to contact with water. The method includes providing a metalloaluminophosphate molecular sieve having a template therein. The metalloaluminophosphate molecular sieve is heated to remove the template and form an activated metalloaluminophosphate molecular sieve having a water content of not greater than 1.25 wt %, based on total weight of the activated metalloaluminophosphate molecular sieve.

In another embodiment, there is provided a method of activating and drying metalloaluminophosphate molecular sieve. Template is removed from the metalloaluminophosphate molecular sieve to activate the metalloaluminophosphate molecular sieve, and the activated metalloaluminophosphate molecular sieve is dried to form an activated metalloaluminophosphate molecular sieve. The dried sieve preferably has a water content of not greater than 1.25 wt %, based on total weight of the activated metalloaluminophosphate molecular sieve.

In yet another embodiment, a metalloaluminophosphate molecular sieve having a template therein is heated with steam at a temperature effective to remove the template and activate the metalloaluminophosphate molecular sieve. The activated metalloaluminophosphate molecular sieve is contacted with a gas in an environment at conditions effective to form a metalloaluminophosphate molecular sieve having a very low water content, preferably not greater than 1.25 wt %, based on total weight of the metalloaluminophosphate molecular sieve.

Also provided in this invention is a method of making activated metalloaluminophosphate molecular sieve. In one embodiment, a metalloaluminophosphate molecular sieve having a template therein is provided. The metalloaluminophosphate molecular sieve is contacted with a gas at conditions effective to remove the template and activate the metalloaluminophosphate molecular sieve. The activated metalloaluminophosphate molecular sieve is then cooled to a temperature lower than that of the gas used to contact the metalloaluminophosphate molecular sieve and remove the template. The temperature at which the activate molecular sieve is cooled is also effective to form an activated metalloaluminophosphate molecular sieve having a water content of not greater than 1.25 wt %, based on total weight of the activated metalloaluminophosphate molecular sieve.

In another aspect of the invention, there is provided a method of making a formulated metalloaluminophosphate molecular sieve catalyst. In a preferred embodiment, a SAPO molecular sieve, matrix material, and a binder are mixed together to form a slurry. Water is then removed from the slurry to form a preformed metalloaluminophosphate molecular sieve catalyst. The preformed metalloaluminophosphate molecular sieve catalyst is contacted a gas, a gas containing steam, or steam to form an activated metalloaluminophosphate molecular sieve catalyst. The activated metalloaluminophosphate molecular sieve catalyst is dried to a water content of not greater than 1.25 wt %, based on total weight of the activated metalloaluminophosphate molecular sieve catalyst.

Also provided in this invention is a method of storing activated metalloaluminophosphate molecular sieve. In one embodiment a metalloaluminophosphate molecular sieve having template therein is contacted with a gas containing water vapor at conditions effective to remove the template and activate the metalloaluminophosphate molecular sieve. The activated metalloaluminophosphate molecular sieve is contacted with a gas at conditions effective to form an activated catalyst having a water content of not greater than 1.25 wt %, based on total weight of the activated metalloaluminophosphate molecular sieve, and the activated metalloaluminophosphate molecular sieve is stored in an anhydrous environment. In another embodiment of the invention, the activate SAPO molecular sieve is stored at a temperature of at least 150° C. At such temperature, an anhydrous storage environment is not necessary.

In the various embodiments of the invention, the heating and/or activating of the molecular sieve or the formulated molecular sieve and the cooling and/or drying of the activated sieve are carried out in one or more vessels. Preferably, activating and cooling and/or drying of the activated sieve are carried out in the same vessel.

BRIEF DESCRIPTION OF THE DRAWING

One embodiment of invention is shown in the attached FIGURE, which shows the effect of temperature on removing water from a molecular sieve.

DETAILED DESCRIPTION OF THE INVENTION

Figure 1:
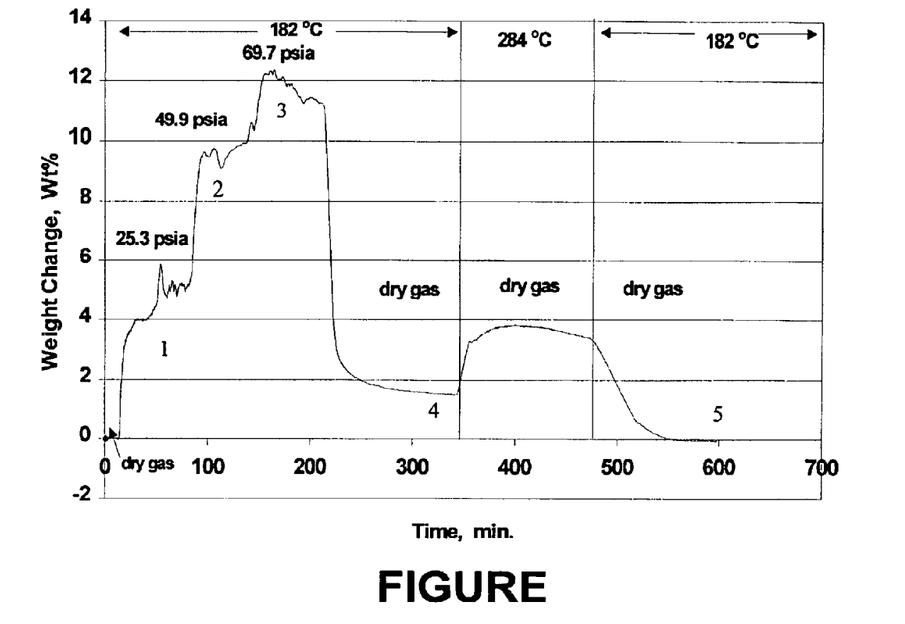

I. Minimizing Water Content of Activated Molecular Sieves

As noted above in the Background of the Invention, molecular sieves are activated by removing template material from the pore structure of the molecular sieves. Once activated, molecules can enter the pore structure. If the activated molecular sieves contain active catalyst sites within the pore structure, the catalyst sites are available to come into contact with molecules entering the pore structure and catalytically convert the molecules to a chemical product. If the molecules entering the pore structure are water molecules, and the molecular sieves are metalloaluminophosphate molecular sieves, then the molecular sieves are likely to undergo catalytic deactivation.

This invention provides methods that minimize the amount of water molecules likely to enter into or remain in an activated metalloaluminophosphate molecular sieve, thereby causing a significant loss of catalytic activity. The methods of this invention can be applied during making, storing and using activated metalloaluminophosphate molecular sieve so as to protect against loss of catalyst activity. The methods are particularly effective in protecting silicoaluminophosphate (SAPO) molecular sieves from loss of catalytic activity due to contact with moisture or water.

The methods of this invention are particularly beneficial, for example, when incorporated into methods of activating the molecular sieve so as to be ready for catalytic use. According to the methods of this invention, molecular sieve appropriately activated, preferably by heating, will contain only a minimal amount of water content, and will remain in a catalytically active state for extended periods of time.

According to one embodiment of this invention, a metalloaluminophosphate molecular sieve, having template therein, is heated to remove the template so as to form an activated metalloaluminophosphate molecular sieve having a water content of not greater than about 1.25 wt %, based on dry weight of the activated metalloaluminophosphate molecular sieve. Preferably, the metalloaluminophosphate molecular sieve is heated to remove the template so as to form an activated metalloaluminophosphate molecular sieve having a water content of not greater than about 1.0 wt %, more preferably not greater than about 0.8 wt %, and most preferably not greater than about 0.5 wt %, based on total weight of the activated metalloaluminophosphate molecular sieve.

The water content of the activated material is preferably determined by taking about a 40 mg sample of activated material and heating the activated material by contacting with dry air at a temperature of 600° C. for at least one hour.

The water content is calculated as:

$$\text{Water Content} = \frac{W_S}{W - W_S}(100\%)$$

where W is the weight of the activated material before drying, and $W_s$ is the weight of the water removed after drying.

In one embodiment, the activated metalloaluminophosphate molecular sieve is dried to a desirable moisture limit by contacting with a gas in an environment in which the environment is at a temperature of at least 225° C. This drying or contacting step can be performed as a cooling step, which follows a step to activate the catalyst. Preferably the activated metalloaluminophosphate molecular sieve is contacted with a gas in an environment having a temperature of at least 250° C., more preferably a temperature of at least 275° C., most preferably a temperature of at least 300° C., and particularly a temperature of at least 340° C.

In another embodiment of the invention, drying of the activated metalloaluminophosphate molecular sieve is carried out by cooling with a dry gas. This cooling follows a conventional calcination step. The calcination is carried out at conventional calcination temperatures to remove template and activate the catalyst. Preferably, calcination is carried out in the presence of water vapor, i.e., steam.

The drying or cooling step is desirably carried out at a temperature that is at least about 50° C. below that of the calcination or activation step. Preferably, the drying or cooling step is carried out at a temperature that is at least about 100° C. below that of the calcination or activation step; more preferably at least about 150° C. below that of the calcination or activation step, and most preferably at least about 200° C. below that of the calcination or activation step.

In one embodiment this invention, the activated molecular sieve is obtained in a relatively dry state by contacting with a gas in a relatively dry environment. The gas is preferably selected from the group consisting of air, nitrogen, helium, flue gas, and any combination thereof, and the environment in which the gas contacts the activated metalloaluminophosphate molecular sieve is substantially low in water content. The water content of the environment preferably has a relative water pressure that is sufficiently low so that little water adsorption occurs. Relative water pressure ($P_r$) in this invention is defined as actual partial pressure of the water (P) divided by saturated water pressure ($P_0$) at a given temperature below the critical temperature of water (374° C.). The relative water pressure is a measure of the wetness of the environment in which the activated molecular sieve is dried or cooled. For example, a $P_r=1$ means 100% water saturation, and a $P_r=0$ means that it is completely dry.

In one embodiment of the invention, the activated molecular sieve is obtained in a relatively dry state by contacting with a gas in an environment in which the environment has a relative water pressure of not greater than about 0.075. Preferably, the activated molecular sieve is heated by contacting with a gas in an environment at a relative water pressure of not greater than about 0.05, more preferably not greater than about 0.025, and most preferably not greater than about 0.001. It is also preferable that the step of contacting the molecular sieve with a gas in the low water pressure environment is carried out as part of the drying process, and in particular prior to loading the activated catalyst into a storage or transport container.

In another embodiment of the invention, the activated molecular sieve is obtained in a relatively dry state by contacting with a dry gas. The dry gas used in the drying or cooling step can be any gas conventionally used to dry molecular sieves. Examples of such dry gases include air, nitrogen, helium, flue gas (i.e., a combustion product gas low in moisture content), or any combination thereof. Dry air is preferred. In particular, dry gases having a relative water pressure of not greater than about 0.075 are desired, preferably not greater than about 0.05, more preferably not greater than about 0.025, and most preferably not greater than about 0.001.

In another embodiment of the invention, a metalloaluminophosphate molecular sieve is activated so as to obtain a hardened, activated molecular sieve catalyst that is acceptably dry. Hardness of the catalyst can be determined by measuring attrition resistance using any conventional method. One such method is the well known Jet Cup Attrition Method. This is also commonly referred to as the Davison Attrition Index or Davison Index (DI). See, e.g., U.S. Pat. Nos. 5,547,564 and 5,364,516. The molecular sieve or catalyst composition of this invention is desirably hard enough to provide protection against physical damage during transportation or storing, and preferably hard enough to be introduced into a process unit to provide protection against physical damage during operation.

In one aspect, the invention provides heating the metalloaluminophosphate molecular sieve under conditions effective to obtain a hardened, activated molecular sieve catalyst having a Davison Index of not greater than 15. Preferably, the metalloaluminophosphate molecular sieve is heated under conditions effective to obtain a hardened, activated molecular sieve catalyst having a Davison Index of not greater than 10, more preferably not greater than 5, and most preferably not greater than 3.

In general, the lower the Davison Index, the harder the composition. In this invention, the Davison Index is determined as follows:

A sample of molecular sieve with binder material is analyzed to determine the average diameter in microns. The sample is then subjected to a standard 20 minute test in a Fluid Catalyst Attrition Apparatus using a hardened steel jet cup having a precision bored orifice, using an air flow of 18 liters per minute. Hardness is determined as a result of the amount of catalyst particles that are broken apart during the test. The greater the number of particles that are broken apart during the test, the less hard the catalyst. The Davison Index is calculated as $$\text{Davision Index} = \frac{\text{wt.} < 20 \text{ micron material formed during test}}{\text{wt. original} \geq 20 \text{ micron fraction}}$$

II. Types of Molecular Sieves

This invention is effective in protecting any molecular sieve containing active catalytic sites from deactivating due to contact with water molecules. Molecular sieves have various chemical, physical, and framework characteristics. Molecular sieves have been well classified by the Structure Commission of the International Zeolite Association according to the rules of the IUPAC Commission on Zeolite Nomenclature. A framework-type describes the topology and connectivity of the tetrahedrally coordinated atoms constituting the framework, and makes an abstraction of the specific properties for those materials. Framework-type zeolite and zeolite-type molecular sieves for which a structure has been established, are assigned a three letter code and are described in the *Atlas of Zeolite Framework Types,* 5th edition, Elsevier, London, England (2001), which is herein fully incorporated by reference.

Crystalline molecular sieve materials all have a 3-dimensional, four-connected framework structure of corner-sharing $TO_4$ tetrahedra, where T is any tetrahedrally coordinated cation. Molecular sieves are typically described in terms of the size of the ring that defines a pore, where the size is based on the number of T atoms in the ring. Other framework-type characteristics include the arrangement of rings that form a cage, and when present, the dimension of channels, and the spaces between the cages. See van Bekkum, et al., *Introduction to Zeolite Science and Practice, Second Completely Revised and Expanded Edition*, Volume 137, pages 1–67, Elsevier Science, B.V., Amsterdam, Netherlands (2001).

Non-limiting examples of molecular sieves are the small pore molecular sieves, AEI, AFT, APC, ATN, ATT, ATV, AWW, BIK, CAS, CHA, CHI, DAC, DDR, EDI, ERI, GOO, KFI, LEV, LOV, LTA, MON, PAU, PHI, RHO, ROG, THO, and substituted forms thereof, the medium pore molecular sieves, AFO, AEL, EUO, HEU, FER, MEL, MFI, MTW, MTT, TON, and substituted forms thereof, and the large pore molecular sieves, EMT, FAU, and substituted forms thereof. Other molecular sieves include ANA, BEA, CFI, CLO, DON, GIS, LTL, MER, MOR, MWW and SOD. Non-limiting examples of preferred molecular sieves, particularly for converting an oxygenate containing feedstock into olefin(s), include AEL, AFY, BEA, CHA, EDI, FAU, FER, GIS, LTA, LTL, MER, MFI, MOR, MTT, MWW, TAM and TON. In one preferred embodiment, the molecular sieve of the invention has an AEI topology or a CHA topology, or a combination thereof, most preferably a CHA topology.

The small, medium and large pore molecular sieves have from a 4-ring to a 12-ring or greater framework-type. Typically, the molecular sieves employed herein have 8-, 10- or 12-ring structures and an average pore size in the range of from about 3 Å to 15 Å. More typically, the molecular sieves, preferably silicoaluminophosphate molecular sieves, have 8-rings and an average pore size less than about 5 Å, such as in the range of from 3 Å to about 5 Å, for example from 3 Å to about 4.5 Å, and particularly from 3.5 Å to about 4.2 Å.

Molecular sieves used herein are preferably metalloaluminophosphate molecular sieves that have a molecular framework that include $[AlO_4]$ and $[PO_4]$ tetrahedral units, such as metal containing aluminophosphates (AlPO). In one embodiment, the metalloaluminophosphate molecular sieves include $[AlO_4]$, $[PO_4]$ and $[SiO_4]$ tetrahedral units, such as silicoaluminophosphates (SAPO). These silicon, aluminum, and phosphorus based molecular sieves and metal-containing derivatives thereof have been described in detail in numerous publications including for example, U.S. Pat. No. 4,567,029 (MeAPO where Me is Mg, Mn, Zn, or Co), U.S. Pat. No. 4,440,871 (SAPO), European Patent Application EP-A-0 159 624 (ELAPSO where El is As, Be, B, Cr, Co, Ga, Ge, Fe, Li, Mg, Mn, Ti or Zn), U.S. Pat. No. 4,554,143 (FeAPO), U.S. Pat. Nos. 4,822,478, 4,683,217, 4,744,885 (FeAPSO), EP-A-0 158 975 and U.S. Pat. No. 4,935,216 (ZnAPSO, EP-A-0 161 489 (CoAPSO), EP-A-0 158 976 (ELAPO, where EL is Co, Fe, Mg, Mn, Ti or Zn), U.S. Pat. No. 4,310,440 ($AlPO_4$), EP-A-0 158 350 (SENAPSO), U.S. Pat. No. 4,973,460 (LiAPSO), U.S. Pat. No. 4,789,535 (LiAPO), U.S. Pat. No. 4,992,250 (GeAPSO), U.S. Pat. No. 4,888,167 (GeAPO), U.S. Pat. No. 5,057,295 (BAPSO), U.S. Pat. No. 4,738,837 (CrAPSO), U.S. Pat. Nos. 4,759,919, and 4,851,106 (CrAPO), U.S. Pat. Nos. 4,758,419, 4,882,038, 5,434,326 and 5,478,787 (MgAPSO), U.S. Pat. No. 4,554,143 (FeAPO), U.S. Pat. No. 4,894,213 (AsAPSO), U.S. Pat. No. 4,913,888 (AsAPO), U.S. Pat. Nos. 4,686,092, 4,846,956 and 4,793,833 (MnAPSO), U.S. Pat. Nos. 5,345,011 and 6,156,931 (MnAPO), U.S. Pat. No. 4,737,353 (BeAPSO), U.S. Pat. No. 4,940,570 (BeAPO), U.S. Pat. Nos. 4,801,309, 4,684,617 and 4,880,520 (TiAPSO), U.S. Pat. Nos. 4,500,651, 4,551,236 and 4,605,492 (TiAPO), U.S. Pat. Nos. 4,824,554, 4,744,970 (CoAPSO), U.S. Pat. No. 4,735,806 (GaAPSO) EP-A-0 293 937 (QAPSO, where Q is framework oxide unit $[QO_2]$), as well as U.S. Pat. Nos. 4,567,029, 4,686,093, 4,781,814, 4,793,984, 4,801,364, 4,853,197, 4,917,876, 4,952,384, 4,956,164, 4,956,165, 4,973,785, 5,241,093, 5,493,066 and 5,675,050, all of which are herein fully incorporated by reference.

Other molecular sieves include those described in R. Szostak, *Handbook of Molecular Sieves*, Van Nostrand Reinhold, New York, N.Y. (1992), which is herein fully incorporated by reference.

The more preferred molecular sieves are SAPO molecular sieves, and metal-substituted SAPO molecular sieves. Suitable metal substituents are alkali metals of Group IA of the Periodic Table of Elements, an alkaline earth metals of Group IIA of the Periodic Table of Elements, a rare earth metals of Group IIIB, including the Lanthanides: lanthanum, cerium, praseodymium, neodymium, samarium, europium, gadolinium, terbium, dysprosium, holmium, erbium, thulium, ytterbium and lutetium; and scandium or yttrium of the Periodic Table of Elements, transition metals of Groups IVB, VB, VIIB, VIIB, VIIIB, and IB of the Periodic Table of Elements and mixtures of any of these metal species. In one embodiment, the metal is selected from the group consisting of Co, Cr, Cu, Fe, Ga, Ge, Mg, Mn, Ni, Sn, Ti, Zn and Zr, and mixtures thereof. The metal atoms may be inserted into the framework of a molecular sieve through a tetrahedral unit, such as $[MeO_2]$, and carry a net charge depending on the valence state of the metal substituent. For example, in one embodiment, when the metal substituent has a valence state of +2, +3, +4, +5, or +6, the net charge of the tetrahedral unit is between −2 and +2.

In one embodiment, the metalloaluminophosphate molecular sieve is represented, on an anhydrous basis, by the formula:

$$mR:(M_xAl_yP_z)O_2$$

wherein R represents at least one templating agent, preferably an organic templating agent; m is the number of moles of R per mole of $(M_xAl_yP_z)O_2$ and m has a value from 0 to 1, preferably 0 to 0.5, and most preferably from 0 to 0.3; x, y, and z represent the mole fraction of Al, P and M as tetrahedral oxides, where M is a metal selected from the group consisting of Group IA, IIA, IB, IIIB, IVB, VB, VIIB, VIIB, VIIIB and Lanthanide's of the Periodic Table of Elements. Preferably M is one or more metals selected from the group consisting of Si, Co, Cr, Cu, Fe, Ga, Ge, Mg, Mn, Ni, Sn, Ti, Zn and Zr. In an embodiment, m is greater than or equal to 0.2, and x, y and z are greater than or equal to 0.01. In another embodiment, m is greater than 0.1 to about 1, x is greater than 0 to about 0.25, y is in the range of from 0.4 to 0.5, and z is in the range of from 0.25 to 0.5, more preferably m is from 0.15 to 0.7, x is from 0.01 to 0.2, y is from 0.4 to 0.5, and z is from 0.3 to 0.5.

Where the molecular sieve is a silicoaluminophosphate or metal-containing silicoaluminophosphate, the SAPO typically has a Si/Al ratio less than 0.65, such as less than 0.40, for example less than 0.32, and particularly less than 0.20. In one embodiment the molecular sieve has a Si/Al ratio in the range of from about 0.65 to about 0.10, such as from about 0.40 to about 0.10, for example from about 0.32 to about 0.10, and particularly from about 0.32 to about 0.15.

Non-limiting examples of SAPO and AlPO molecular sieves useful herein include one or a combination of SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56, AlPO-5, AlPO-11, AlPO-18, AlPO-31, AlPO-34, AlPO-36, AlPO-37, AlPO-46, and metal containing molecular sieves thereof. Of these, particularly useful molecular sieves are one or a combination of SAPO-18, SAPO-34, SAPO-35, SAPO-44, SAPO-56, AlPO-18, AlPO-34 and metal containing derivatives thereof, such as one or a combination of SAPO-18, SAPO-34, AlPO-34, AlPO-18, and metal containing derivatives thereof, and especially one or a combination of SAPO-34, AlPO-18, and metal containing derivatives thereof.

In an embodiment, the molecular sieve is an intergrowth material having two or more distinct crystalline phases within one molecular sieve composition. In particular, intergrowth molecular sieves are described in U.S. Patent Application Publication No. 2002-0165089 and International Publication No. WO 98/15496, published Apr. 16, 1998, both of which are herein fully incorporated by reference. For example, SAPO-18, AlPO-18 and RUW-18 have an AEI framework-type, and SAPO-34 has a CHA framework-type. Thus, the molecular sieve used herein may comprise at least one intergrowth phase of AEI and CHA framework-types, especially where the ratio of CHA framework-type to AEI framework-type, as determined by the DIFFaX method disclosed in U.S. Patent Application Publication No. 2002-0165089, is greater than 1:1.

III. Methods of Making Molecular Sieve Crystals and Formulated Molecular Sieve Catalyst A. Making Molecular Sieve Crystals Generally, molecular sieves (i.e., molecular sieve crystals) are synthesized by the hydrothermal crystallization of one or more of a source of aluminum, a source of phosphorus, a source of silicon, water and a templating agent, such as a nitrogen containing organic compound. Typically, a combination of sources of silicon and aluminum, or silicon, aluminum and phosphorus, water and one or more templating agents, is placed in a sealed pressure vessel. The vessel is optionally lined with an inert plastic such as polytetrafluoroethylene, and heated under a crystallization pressure and temperature, until a crystalline material is formed, which can then be recovered by filtration, centrifugation and/or decanting.

Non-limiting examples of silicon sources include silicates, fumed silica, for example, Aerosil-200 available from Degussa Inc., New York, N.Y., and CAB-O-SIL M-5, organosilicon compounds such as tetraalkylorthosilicates, for example, tetramethylorthosilicate (TMOS) and tetraethylorthosilicate (TEOS), colloidal silicas or aqueous suspensions thereof, for example Ludox-HS-40 sol available from E.I. du Pont de Nemours, Wilmington, Del., silicic acid or any combination thereof.

Non-limiting examples of aluminum sources include aluminum alkoxides, for example aluminum isopropoxide, aluminum phosphate, aluminum hydroxide, sodium aluminate, pseudo-boehmite, gibbsite and aluminum trichloride, or any combination thereof. A convenient source of aluminum is pseudo-boehmite, particularly when producing a silicoaluminophosphate molecular sieve.

Non-limiting examples of phosphorus sources, which may also include aluminum-containing phosphorus compositions, include phosphoric acid, organic phosphates such as triethyl phosphate, and crystalline or amorphous aluminophosphates such as $AlPO_4$, phosphorus salts, or combinations thereof. A convenient source of phosphorus is phosphoric acid, particularly when producing a silicoaluminophosphate.

In general, templating agents or templates include compounds that contain elements of Group 15 of the Periodic Table of Elements, particularly nitrogen, phosphorus, arsenic and antimony. Typical templates also contain at least one alkyl or aryl group, such as an alkyl or aryl group having from 1 to 10 carbon atoms, for example from 1 to 8 carbon atoms. Preferred templates are nitrogen-containing compounds, such as amines, quaternary ammonium compounds and combinations thereof. Suitable quaternary ammonium compounds are represented by the general formula $R_4N^+$, where each R is hydrogen or a hydrocarbyl or substituted hydrocarbyl group, preferably an alkyl group or an aryl group having from 1 to 10 carbon atoms.

Non-limiting examples of templates include tetraalkyl ammonium compounds including salts thereof, such as tetramethyl ammonium compounds, tetraethyl ammonium compounds, tetrapropyl ammonium compounds, and tetrabutylammonium compounds, cyclohexylamine, morpholine, di-n-propylamine (DPA), tripropylamine, triethylamine (TEA), triethanolamine, piperidine, cyclohexylamine, 2-methylpyridine, N,N-dimethylbenzylamine, N,N-diethylethanolamine, dicyclohexylamine, N,N-dimethylethanolamine, choline, N,N'-dimethylpiperazine, 1,4-diazabicyclo(2,2,2)octane, N',N',N,N-tetramethyl-(1,6)hexanediamine, N-methyldiethanolamine, N-methyl-ethanolamine, N-methyl piperidine, 3-methyl-piperidine, N-methylcyclohexylamine, 3-methylpyridine, 4-methylpyridine, quinuclidine, N,N'-dimethyl-1,4-diazabicyclo(2,2,2) octane ion; di-n-butylamine, neopentylamine, di-n-pentylamine, isopropylamine, t-butyl-amine, ethylenediamine, pyrrolidine, and 2-imidazolidone. Preferred templates are selected from the group consisting of tetraethyl ammonium salts, cyclopentylamine, aminomethyl cyclohexane, piperidine, triethylamine, cyclohexylamine, tri-ethyl hydroxyethylamine, morpholine, dipropylamine (DPA), pyridine, isopropylamine, heated degraded forms thereof, and combinations thereof.

The pH of the synthesis mixture containing at a minimum a silicon, aluminum, optionally a phosphorus composition, and a templating agent, is generally in the range of from 2 to 10, such as from 4 to 9, for example from 5 to 8.

Generally, the synthesis mixture described above is sealed in a vessel and heated, preferably under autogenous pressure, to a temperature in the range of from about 80° C. to about 250° C., such as from about 100° C. to about 250° C., for example from about 125° C. to about 225° C., such as from about 150° C. to about 180° C.

In one embodiment, the synthesis of molecular sieve crystalline particles is aided by seeds from another or the same framework type molecular sieve.

The time required to form the crystalline particles is usually dependent on the temperature and can vary from immediately up to several weeks. Typically, the crystallization time is from about 30 minutes to around 2 weeks, such as from about 45 minutes to about 240 hours, for example from about 1 hour to about 120 hours. The hydrothermal crystallization may be carried out with or without agitation or stirring.

One method for crystallization involves subjecting an aqueous reaction mixture containing an excess amount of a templating agent to crystallization under hydrothermal conditions, establishing an equilibrium between molecular sieve formation and dissolution, and then, removing some of the excess templating agent and/or organic base to inhibit dissolution of the molecular sieve. See, for example, U.S. Pat. No. 5,296,208, which is herein fully incorporated by reference.

Other methods for synthesizing molecular sieves or modifying molecular sieves are described in U.S. Pat. No. 5,879,655 (controlling the ratio of the templating agent to phosphorus), U.S. Pat. No. 6,005,155 (use of a modifier without a salt), U.S. Pat. No. 5,475,182 (acid extraction), U.S. Pat. No. 5,962,762 (treatment with transition metal), U.S. Pat. Nos. 5,925,586 and 6,153,552 (phosphorus modified), U.S. Pat. No. 5,925,800 (monolith supported), U.S. Pat. No. 5,932,512 (fluorine treated), U.S. Pat. No. 6,046,373 (electromagnetic wave treated or modified), U.S. Pat. No. 6,051,746 (polynuclear aromatic modifier), U.S. Pat. No. 6,225,254 (heating template), PCT WO 01/36329 published May 25, 2001 (surfactant synthesis), PCT WO 01/25151 published Apr. 12, 2001 (staged acid addition), PCT WO 01/60746 published Aug. 23, 2001 (silicon oil), U.S. patent application Ser. No. 09/929,949 filed Aug. 15, 2001 (cooling molecular sieve), U.S. patent application Ser. No. 09/615,526 filed Jul. 13, 2000 (metal impregnation including copper), U.S. patent application Ser. No. 09/672,469 filed Sep. 28, 2000 (conductive microfilter), and U.S. patent application Ser. No. 09/754,812 filed Jan. 4, 2001 (freeze drying the molecular sieve), which are all herein fully incorporated by reference.

Once the crystalline molecular sieve product is formed, usually in a slurry state, it may be recovered by any standard technique well known in the art, for example, by centrifugation or filtration. The recovered crystalline particle product, normally termed the "wet filter cake", may then be washed, such as with water, and then dried, such as in air, before being formulated into a catalyst composition. Alternatively, the wet filter cake may be formulated into a catalyst composition directly, that is without any drying, or after only partial drying.

B. Making Formulated Molecular Sieve Catalyst

1. Components of Formulated Molecular Sieve Catalyst

Molecular sieve catalyst, which contains molecular sieve crystal product, and typically binder and matrix materials, is also referred to as a formulated catalyst. It is made by mixing together molecular sieve crystals (which includes template) and a liquid, optionally with matrix material and/or binder, to form a slurry. The slurry is then dried (i.e., liquid is removed), without completely removing the template from the molecular sieve. Since this dried molecular sieve catalyst includes template, it has not been activated, and is considered a preformed catalyst. The catalyst in this form is resistant to catalytic loss by contact with moisture or water. However, the preformed catalyst must be activated before use, and this invention provides appropriate methods of activating, preferably by further heat treatment, to maintain a low water content within the activated catalyst.

The liquid used to form the slurry can be any liquid conventionally used in formulating molecular sieve catalysts. Non-limiting examples of suitable liquids include water, alcohol, ketones, aldehydes, esters, or a combination thereof. Water is a preferred liquid.

Matrix materials are optionally included in the slurry used to make the formulated molecular sieve catalyst of this invention. Such materials are typically effective as thermal sinks assisting in shielding heat from the catalyst composition, for example, during regeneration. They can further act to densify the catalyst composition, increase catalyst strength such as crush strength and attrition resistance, and to control the rate of conversion in a particular process. Non-limiting examples of matrix materials include one or more of: rare earth metals, metal oxides including titania, zirconia, magnesia, thoria, beryllia, quartz, silica or sols, and mixtures thereof; for example, silica-magnesia, silica-zirconia, silica-titania, silica-alumina and silica-alumina-thoria.

In one embodiment, matrix materials are natural clays, such as those from the families of montmorillonite and kaolin. These natural clays include kaolins known as, for example, Dixie, McNamee, Georgia and Florida clays. Non-limiting examples of other matrix materials include: halloysite, kaolinite, dickite, nacrite, or anauxite. Optionally, the matrix material, preferably any of the clays, are calcined, acid treated, and/or chemical treated before being used as a slurry component. Under the optional calcination treatment, the matrix material will still be considered virgin material as long as the material has not been previously used in a catalyst formulation.

In a particular embodiment, the matrix material is a clay or a clay-type composition, preferably a clay or clay-type composition having a low iron or titania content, and most preferably the matrix material is kaolin. Kaolin has been found to form a pumpable, high solid content slurry; it has a low fresh surface area, and it packs together easily due to its platelet structure.

Preferably, the matrix material, particularly clay, and preferably kaolin, has an average particle size of from about 0.05 μm to about 0.75 μm; more preferably from about 0.1 μm to about 0.6 μm. It is also desirable that the matrix material have a $d_{90}$ particle size distribution of less than about 1.5 μm, preferably less than about 1 μm.

Binders are also optionally included in the slurry used to make the formulated molecular sieve catalysts of this invention. Such materials act like glue, binding together the molecular sieve crystals and other materials, to form a formulated catalyst composition. Non-limiting examples of binders include various types of inorganic oxide sols such as hydrated aluminas, silicas, and/or other inorganic oxide sols. In one embodiment of the invention, the binder is an alumina-containing sol, preferably aluminium chlorohydrate. Upon calcining, the inorganic oxide sol, is converted into an inorganic oxide matrix component, which is particularly effective in forming a hardened molecular sieve catalyst composition. For example, an alumina sol will convert to an aluminium oxide matrix following heat treatment.

Aluminium chlorohydrate, a hydroxylated aluminium based sol containing a chloride counter ion, also known as aluminium chlorohydrol, has the general formula $$Al_mO_n(OH)_oCl_p \cdot x(H_2O)$$

wherein m is 1 to 20, n is 1 to 8, o is 5 to 40, p is 2 to 15, and x is 0 to 30. In one embodiment, the binder is $Al_{13}O_4(OH)_{24}Cl_7 \cdot 12(H_2O)$ as is described in G. M. Wolterman, et al., Stud. Surf. Sci. and Catal., 76, pages 105–144, Elsevier, Amsterdam, 1993, which is herein incorporated by reference. In another embodiment, one or more binders are present in combination with one or more other non-limiting examples of alumina materials such as aluminium oxyhydroxide, γ-alumina, boehmite and transitional aluminas such as α-alumina, β-alumina, γ-alumina, δ-alumina, ε-alumina, κ-alumina, and ρ-alumina, aluminium trihydroxide, such as gibbsite, bayerite, nordstrandite, doyelite, and mixtures thereof.

In another embodiment, the binders are alumina sols, predominantly comprising aluminium oxide, optionally including silicon. In yet another embodiment, the binders are peptised alumina made by treating alumina hydrates such as pseudobohemite, with an acid, preferably a non-halogen acid, to prepare sols or aluminium ion solutions. Non-limiting examples of commercially available colloidal alumina sols include Nalco 8676 available from Nalco Chemical Co., Naperville, Ill., and Nyacol available from the Nyacol Nano Technology Inc., Boston, Mass.

If binder is not used in making the molecular sieve catalyst, the catalyst is considered a binderless catalyst. If binder is used, the amount of binder used to prepare the molecular sieve catalyst ranges from about 2% by weight to about 30% by weight, based on the total weight of the binder, the molecular sieve, and optionally included matrix material, excluding the liquid (i.e., after drying). Preferably the amount of binder used to prepare the molecular sieve catalyst ranges from about 5% by weight to about 20% by weight, more preferably from about 7% by weight to about 15% by weight, based on the total weight of the binder, the molecular sieve, and optionally included matrix material, excluding the liquid (i.e., after drying).

2. Making a Slurry with Molecular Sieve Crystals

The molecular sieve crystals are mixed with liquid, and the optional matrix material and/or binder, using conventional techniques to form a slurry. The components can be mixed in any order, and the mixture is thoroughly stirred to form the slurry. The more thorough the stirring, the better the consistency of the slurry.

The mixing of the slurry is preferably sufficient to break any aggregates or large particles into smaller, more uniform particles. In general, the more vigorous the mixing, the smaller the catalyst particles formed in the slurry. Mixing using high-shear mixers is preferred. In general, high-shear mixers are capable of rotating at speeds of at least about 3,000 rpm laboratory scale equivalent.

Solids particle size of the slurry can be indirectly determined by measuring the viscosity of the slurry. In general, the higher the viscosity, the smaller the solids particle size in the slurry. The viscosity of the slurry should not be too high, so that mixing is not effective in breaking apart large particles, or too low, so that drying will not produce acceptable particle formation.

In one embodiment, the slurry has a viscosity of from about 100 cP (0.1 Pa/sec) to about 9,500 cP (9.5 Pa/sec), as measured using a Brookfield LV-DVE viscometer with a No. 3 spindle at 10 rpm. Preferably, the slurry has a viscosity of from about 200 cP (0.2 Pa/sec) to about 8,500 cP (8.5 Pa/sec), and more preferably from about 350 cP (0.375 Pa/sec) to about 8,000 cP (8 Pa/sec), as measured using a Brookfield LV-DVE viscometer with a No. 3 spindle at 10 rpm.

In another embodiment, the slurry has a solids content of from about 10 wt % to about 75 wt %, based on total weight of the slurry. Preferably the slurry has a solids content of from about 15 wt % to about 70 wt %, more preferably from about 20 wt % to about 65 wt %, based on the total weight of the slurry. The solids content can be measured using any conventional means. However, a CEM MAS 700 microwave muffle furnace is particularly preferred to give results consistent with the values recited herein.

In one embodiment, the slurry used to make the formulated molecular sieve catalyst contains binder and matrix material at a weight ratio of from 0:1 to 1:1. Preferably, the slurry used to make the molecular sieve catalyst contains binder and matrix material at a weight ratio of from 1:15 to 1:2, more preferably 1:10 to 1:2, and most preferably 1:6 to 1:1. In case where binders are not used, the molecular sieve component itself acts as a binder.

3. Making a Preformed Catalyst

Water is removed from the slurry containing the molecular sieve crystals to form a preformed molecular sieve catalyst. Preferably, the slurry is fed to a forming unit that produces the preformed molecular sieve catalyst composition. The forming unit may be any conventional unit, such as a spray dryer, pelletizer, extruder, etc. In a preferred embodiment, the forming unit is spray dryer, which removes water from the slurry by a heating or drying process. Preferably, the forming unit is maintained at a temperature sufficient to remove a majority of the liquid from the slurry.

When a spray dryer is used as the forming (or drying) unit, typically, the slurry of the molecular sieve particles, and optional matrix material and/or binder, is fed to the spray drying unit along with a drying gas. The drying gas contacts the slurry and acts to remove water to form the preformed molecular sieve catalyst. Conventional drying conditions can be used. Such conditions include an average inlet temperature ranging from about 150° C. to about 550° C., and an average outlet temperature ranging from about 100° C. to about 250° C.

During spray drying, the slurry is passed through a nozzle distributing the slurry into small droplets, resembling an aerosol spray, into a drying chamber where atomization occurs. Atomization is achieved by forcing the slurry through a single nozzle or multiple nozzles with a pressure drop in the range of from about 100 psia to about 1,000 psia (about 690 kPaa to about 6,895 kPaa). In another embodiment, the slurry is fed through a single nozzle or multiple nozzles along with an atomization or contacting fluid such as air, steam, flue gas, or any other suitable gas.

In yet another embodiment, the slurry that is used to make the preformed catalyst is directed to the perimeter of a spinning wheel that distributes the slurry into small droplets. The size of the droplets is controlled by one or more factors including slurry viscosity, surface tension, flow rate, pressure, and temperature of the slurry; the shape and dimension of the nozzle(s); or the spinning rate of the wheel. These droplets are then dried in a co-current or counter-current flow of air passing through a spray drier to form a preformed molecular sieve catalyst composition. An example of a conventional spray drying process is described in U.S. Pat. No. 4,946,814, which is incorporated herein by reference.

C. Protecting Molecular Sieve and Catalyst from Deactivation

The molecular sieve material of this invention is protected by appropriate activation to remove template from the molecular sieve and minimize water content in the activated material. The molecular sieve crystals themselves can be activated for catalytic use or for storing or transporting prior to use. However, it is preferred that the molecular sieves be formulated into a preformed catalyst, then activated, since the sieves are typically most useful as a formulated product. The formulated product generally provides the most effective particle size and hardness for commercial scale equipment.

The activated molecular sieve material is protected from catalytic deactivation by maintaining the activated material at a low moisture content, preferably a water content of not greater than 1.25 wt %, based on total weight of the material, as described above (e.g., preferably not greater than 1.0 wt %, more preferably not greater than 0.8 wt %, and most preferably not greater than 0.5 wt %). This is achieved by limiting or preventing water from contacting the activated molecular sieve material at a temperature lower than the critical temperature of water.

In one embodiment of the invention, the molecular sieve material is activated by removing the template by heat. In a preferred embodiment, the heat is sufficient to remove water that is formed as a result of the combustion of the template. Preferably, the molecular sieve material is heated at a temperature greater than the critical temperature of water. At this temperature water formed during the combustion process will not condense or be retained by the molecular sieve. Preferably, the template is removed by contacting with steam at a temperature greater than the critical temperature of water.

Heating to remove template and activate the molecular sieve is generally referred to in this invention as calcination. Conventional calcination devices can be used. Such devices include rotary calciners, fluid bed calciners, batch ovens, and the like. Calcination time is typically dependent on the degree of hardening of the molecular sieve catalyst composition and the temperature.

Conventional calcination temperatures are effective to remove template materials and to activate the molecular sieve catalyst of this invention. Such temperatures are generally in the range from about 400° C. to about 1,000° C., preferably from about 500° C. to about 800° C., and most preferably from about 550° C. to about 700° C.

Following heat activation by calcining for example, the activated molecular sieve is cooled, since it will generally be at a temperature that is too high for immediately loading into a container. In a preferred embodiment, the activated molecular sieve is cooled by contacting with a gas, preferably a dry gas, so that water is prevented from entering the pores of the molecular sieve. Preferably, the gas is a dry gas, more preferably a dry, inert gas conventionally used to dry molecular sieves as described above (e.g., air, nitrogen, helium, flue gas, or a combination thereof at a relative water pressure of not greater than about 0.075, preferably not greater than about 0.05, more preferably not greater than about 0.025, and most preferably not greater than about 0.001). As also described above, it is preferable that the activated be cooled by contacting the gas in an environment at a temperature of at least about 225° C. (e.g., desirably at least 250° C., preferably at least 275° C., more preferably at least 300° C., and most preferably at least 340° C.). This activation and subsequent cooling or drying of the molecular sieve can be carried out in separate heating units or in the same heating unit, though in different regions of that unit.

The method of protecting activated molecular sieve, i.e., metalloaluminophosphate molecular sieve, from catalytic deactivation due to contact with water can be effectively incorporated into methods for making and activating molecular sieve particles, as well as methods for making and activating formulated molecular sieve catalysts. In a preferred embodiment, the method of protecting activated molecular sieves is incorporated into methods for making and activating formulated molecular sieve catalysts.

In one embodiment, formulated catalyst is made by mixing together metalloaluminophosphate molecular sieve, matrix material, and a binder to form a slurry. Water is removed from the slurry to form a preformed molecular sieve catalyst. If desired, the preformed catalyst can be stored until a later date, when activation is to occur. In the preformed state, the catalyst is generally protected against deactivation as a result of contact with moisture.

In one embodiment, the preformed catalyst is activated by contacting with air or air and steam to remove template material. In order to protect the activated catalyst from deactivation, it is dried or cooled in a manner so that no significant amount of water is retained by the activated catalyst. The activated catalyst can then be appropriately stored for an extended period of time, if desired. Preferably, the preformed catalyst is activated by contacting with an air composition comprising at least about 1 wt % steam, more preferably at least about 5 wt %, and most preferably at least about 10 wt % steam, based on total weight of the air composition.

IV. Storing the Molecular Sieves or Formulated Molecular Sieve Catalyst

The activated molecular sieve is stored so that there is not a substantial loss in catalytic activity. Catalytic activity according to this invention is defined by a methanol uptake index. The methanol uptake index is defined as the ratio of the methanol adsorption capacity (wt %) of an activated metalloaluminophosphate molecular sieve at the time of measurement to the maximum methanol adsorption capacity (wt %) of the activated molecular sieve (i.e., the initial methanol adsorption capacity after activation). For example, this means that an activated molecular sieve that has no loss in catalytic activity will have a methanol uptake index of 1, whereas an activated molecular sieve that has little to no catalytic activity will have a methanol uptake index of 0.

Techniques for measuring methanol adsorption capacity are known to those of ordinary skill in the art. In a preferred technique, about 5 mg of sample is introduced into a thermogravimetric analyzer (TGA). The sample is subjected to a heat treatment process, which includes: (1) heating from room temperature to 450° C., with a heat up rate of 20° C./min. in air; (2) holding at 450° C. for 40 min. in air; and cooling to 30° C. in air. After the sample has reached 30° C., the air flow is switched to a methanol containing nitrogen flow with a methanol partial pressure of 0.09 atm. The sample is contacted with this nitrogen/methanol mixture for 180 minutes. The methanol adsorption capacity is the weight percent weight increase after the 180 minutes contact with the methanol vapor.

In one embodiment of the invention, the activated molecular sieve material is loaded into a container before the catalytic activity is significantly lost. Desirably, the molecular sieve material that is loaded into the container has a methanol uptake index of at least 0.15. Preferably, the molecular sieve material that is loaded into the container has a methanol uptake index of at least 0.4, more preferably at least 0.6, and most preferably at least 0.8.

In another embodiment of the invention, the activated molecular sieve material that is low in water content is loaded into a container at a temperature of at least 225° C. Preferably the catalyst is loaded into a container at a temperature of at least 250° C., more preferably at a temperature of at least 275° C., most preferably at a temperature of at least 300° C., and particularly at a temperature of at least 340° C.

In yet another embodiment of the invention, the container provides an anhydrous environment. Such an environment can be provided by covering the sieve loaded into a container with a gas or liquid blanket under anhydrous conditions. As provided herein, the anhydrous gas or liquid blanket will have no more than a limited amount of water. The anhydrous gas blanket can be provided under vacuum conditions or under atmospheric or greater pressure conditions, and will desirably have not greater than about 1.2 volume percent water, preferably not greater than about 0.2 volume percent water, and more preferably not greater than about 0.02 volume percent water. The anhydrous liquid blanket will desirably have not greater than about 200 ppm water, preferably not greater than about 100 ppm water, and more preferably not greater than about 50 ppm water. The anhydrous environment can be applied during storage, transport or loading of the activated material.

The anhydrous gas blanket is a gas under standard temperature and pressure conditions and does not react to any significant degree with the molecular sieve structure. The gas is preferably selected from the group consisting of nitrogen, helium, CO, $CO_2$, $H_2$, argon, $O_2$, light alkanes (especially $C_1$–$C_4$ alkanes, particularly methane and ethane), cyclo-alkanes and mixtures thereof, e.g. air. Air is a preferred gas. The gas blanket can be maintained at any pressure, including under vacuum or at pressures above standard, even if the gas becomes liquid at pressures above standard, as long as the conditions remain anhydrous.

The anhydrous liquid blanket is a liquid under standard temperature and pressure conditions, and does not react to any significant degree with the molecular sieve structure. The liquid is preferably selected from the group consisting of alkanes, cyclo-alkanes, $C_6$–$C_{30}$ aromatics, alcohols, particularly $C_4$+ branched alcohols.

V. Uses of the Molecular Sieves

The molecular sieves described above are useful in a variety of processes including cracking of, for example, a naphtha feed to light olefin(s) (U.S. Pat. No. 6,300,537) or higher molecular weight (MW) hydrocarbons to lower MW hydrocarbons; hydrocracking of, for example, heavy petroleum and/or cyclic feedstock; isomerization of, for example, aromatics such as xylene; polymerization of, for example, one or more olefin(s) to produce a polymer product; reforming; hydrogenation; dehydrogenation; dewaxing of, for example, hydrocarbons to remove straight chain paraffins; absorption of, for example, alkyl aromatic compounds for separating out isomers thereof; alkylation of, for example, aromatic hydrocarbons such as benzene and alkyl benzene, optionally with propylene to produce cumene or with long chain olefins; transalkylation of, for example, a combination of aromatic and polyalkylaromatic hydrocarbons; dealkylation; hydrodecyclization; disproportionation of, for example, toluene to make benzene and paraxylene; oligomerization of, for example, straight and branched chain olefin(s); and dehydrocyclization.

Preferred processes include processes for converting naphtha to highly aromatic mixtures; converting light olefin(s) to gasoline, distillates and lubricants; converting oxygenates to olefin(s); converting light paraffins to olefins and/or aromatics; and converting unsaturated hydrocarbons (ethylene and/or acetylene) to aldehydes for conversion into alcohols, acids and esters.

The most preferred process of the invention is a process directed to the conversion of a feedstock to one or more olefin(s). Typically, the feedstock contains one or more aliphatic-containing compounds such that the aliphatic moiety contains from 1 to about 50 carbon atoms, such as from 1 to 20 carbon atoms, for example from 1 to 10 carbon atoms, and particularly from 1 to 4 carbon atoms.

Non-limiting examples of aliphatic-containing compounds include alcohols such as methanol and ethanol, alkyl mercaptans such as methyl mercaptan and ethyl mercaptan, alkyl sulfides such as methyl sulfide, alkylamines such as methylamine, alkyl ethers such as dimethyl ether, diethyl ether and methylethyl ether, alkyl halides such as methyl chloride and ethyl chloride, alkyl ketones such as dimethyl ketone, formaldehydes, and various acids such as acetic acid.

In a preferred embodiment of the process of the invention, the feedstock contains one or more oxygenates, more specifically, one or more organic compound(s) containing at least one oxygen atom. In the most preferred embodiment of the process of invention, the oxygenate in the feedstock is one or more alcohol(s), preferably aliphatic alcohol(s) where the aliphatic moiety of the alcohol(s) has from 1 to 20 carbon atoms, preferably from 1 to 10 carbon atoms, and most preferably from 1 to 4 carbon atoms. The alcohols useful as feedstock in the process of the invention include lower straight and branched chain aliphatic alcohols and their unsaturated counterparts.

Non-limiting examples of oxygenates include methanol, ethanol, n-propanol, isopropanol, methyl ethyl ether, dimethyl ether, diethyl ether, di-isopropyl ether, formaldehyde, dimethyl carbonate, dimethyl ketone, acetic acid, and mixtures thereof.

In the most preferred embodiment, the feedstock is selected from one or more of methanol, ethanol, dimethyl ether, diethyl ether or a combination thereof, more preferably methanol and dimethyl ether, and most preferably methanol.

The various feedstocks discussed above, particularly a feedstock containing an oxygenate, more particularly a feedstock containing an alcohol, is converted primarily into one or more olefin(s). The olefin(s) produced from the feedstock typically have from 2 to 30 carbon atoms, preferably 2 to 8 carbon atoms, more preferably 2 to 6 carbon atoms, still more preferably 2 to 4 carbons atoms, and most preferably are ethylene and/or propylene.

The catalyst composition of the invention is particularly useful in the process that is generally referred to as the gas-to-olefins (GTO) process or, alternatively, the methanol-to-olefins (MTO) process. In this process, an oxygenated feedstock, most preferably a methanol-containing feedstock, is converted in the presence of a molecular sieve catalyst composition into one or more olefin(s), preferably and predominantly, ethylene and/or propylene.

Using the catalyst composition of the invention for the conversion of a feedstock, preferably a feedstock containing one or more oxygenates, the amount of olefin(s) produced based on the total weight of hydrocarbon produced is greater than 50 weight percent, typically greater than 60 weight percent, such as greater than 70 weight percent, and preferably greater than 75 weight percent. In one embodiment, the amount of ethylene and/or propylene produced based on the total weight of hydrocarbon product produced is greater than 65 weight percent, such as greater than 70 weight percent, for example greater than 75 weight percent, and preferably greater than 78 weight percent. Typically, the amount ethylene produced in weight percent based on the total weight of hydrocarbon product produced, is greater than 30 weight percent, such as greater than 35 weight percent, for example greater than 40 weight percent. In addition, the amount of propylene produced in weight percent based on the total weight of hydrocarbon product produced is greater than 20 weight percent, such as greater than 25 weight percent, for example greater than 30 weight percent, and preferably greater than 35 weight percent.

In addition to the oxygenate component, such as methanol, the feedstock may contains one or more diluent(s), which are generally non-reactive to the feedstock or molecular sieve catalyst composition and are typically used to reduce the concentration of the feedstock. Non-limiting examples of diluents include helium, argon, nitrogen, carbon monoxide, carbon dioxide, water, essentially non-reactive paraffins (especially alkanes such as methane, ethane, and propane), essentially non-reactive aromatic compounds, and mixtures thereof. The most preferred diluents are water and nitrogen, with water being particularly preferred.

The diluent, for example water, may be used either in a liquid or a vapor form, or a combination thereof. The diluent may be either added directly to the feedstock entering a reactor or added directly to the reactor, or added with the molecular sieve catalyst composition.

The present process can be conducted over a wide range of temperatures, such as in the range of from about 200° C. to about 1000° C., for example from about 250° C. to about 800° C., including from about 250° C. to about 750° C., conveniently from about 300° C. to about 650° C., typically from about 350° C. to about 600° C. and particularly from about 350° C. to about 550° C.

Similarly, the present process can be conducted over a wide range of pressures including autogenous pressure. Typically the partial pressure of the feedstock exclusive of any diluent therein employed in the process is in the range of from about 0.1 kPaa to about 5 MPaa, such as from about 5 kpaa to about 1 MPaa, and conveniently from about 20 kPaa to about 500 kPaa.

The weight hourly space velocity (WHSV), defined as the total weight of feedstock excluding any diluents per hour per weight of molecular sieve in the catalyst composition, typically ranges from about 1 $hr^{-1}$ to about 5000 $hr^{-1}$, such as from about 2 $hr^{-1}$ to about 3000 $hr^{-1}$, for example from about 5 $hr^{-1}$ to about 1500 $hr^{-1}$, and conveniently from about 10 $hr^{-1}$ to about 1000 $hr^{-1}$. In one embodiment, the WHSV is greater than 20 $hr^{-1}$ and, where feedstock contains methanol and/or dimethyl ether, is in the range of from about 20 $hr^{-1}$ to about 300 $hr^{-1}$.

Where the process is conducted in a fluidized bed, the superficial gas velocity (SGV) of the feedstock including diluent and reaction products within the reactor system, and particularly within a riser reactor(s), is at least 0.1 meter per second (m/sec), such as greater than 0.5 m/sec, such as greater than 1 m/sec, for example greater than 2 m/sec, conveniently greater than 3 m/sec, and typically greater than 4 m/sec. See for example U.S. patent application Ser. No. 09/708,753 filed Nov. 8, 2000, which is herein incorporated by reference.

The process of the invention is conveniently conducted as a fixed bed process, or more typically as a fluidized bed process. (including a turbulent bed process), such as a continuous fluidized bed process, and particularly a continuous high velocity fluidized bed process.

The process can take place in a variety of catalytic reactors such as hybrid reactors that have a dense bed or fixed bed reaction zones and/or fast fluidized bed reaction zones coupled together, circulating fluidized bed reactors, riser reactors, and the like. Suitable conventional reactor types are described in for example U.S. Pat. No. 4,076,796, U.S. Pat. No. 6,287,522 (dual riser), and *Fluidization Engineering*, D. Kunii and O. Levenspiel, Robert E. Krieger Publishing Company, New York, N.Y. 1977, which are all herein fully incorporated by reference.

The preferred reactor types are riser reactors generally described in *Riser Reactor, Fluidization and Fluid-Particle Systems*, pages 48 to 59, F. A. Zenz and D. F. Othmo, Reinhold Publishing Corporation, New York, 1960, and U.S. Pat. No. 6,166,282 (fast-fluidized bed reactor), and U.S. patent application Ser. No. 09/564,613 filed May 4, 2000 (multiple riser reactor), which are all herein fully incorporated by reference.

In one practical embodiment, the process is conducted as a fluidized bed process or high velocity fluidized bed process utilizing a reactor system, a regeneration system and a recovery system.

In such a process the reactor system conveniently includes a fluid bed reactor system having a first reaction zone within one or more riser reactor(s) and a second reaction zone within at least one disengaging vessel, typically comprising one or more cyclones. In one embodiment, the one or more riser reactor(s) and disengaging vessel are contained within a single reactor vessel. Fresh feedstock, preferably containing one or more oxygenates, optionally with one or more diluent(s), is fed to the one or more riser reactor(s) into which a molecular sieve catalyst composition or coked version thereof is introduced. In one embodiment, prior to being introduced to the riser reactor(s), the molecular sieve catalyst composition or coked version thereof is contacted with a liquid, preferably water or methanol, and/or a gas, for example, an inert gas such as nitrogen.

In an embodiment, the amount of fresh feedstock fed as a liquid and/or a vapor to the reactor system is in the range of from 0.1 weight percent to about 85 weight percent, such as from about 1 weight percent to about 75 weight percent, more typically from about 5 weight percent to about 65 weight percent based on the total weight of the feedstock including any diluent contained therein. The liquid and vapor feedstocks may be the same composition, or may contain varying proportions of the same or different feedstocks with the same or different diluents.

The feedstock entering the reactor system is preferably converted, partially or fully, in the first reactor zone into a gaseous effluent that enters the disengaging vessel along with the coked catalyst composition. In the preferred embodiment, cyclone(s) are provided within the disengaging vessel to separate the coked catalyst composition from the gaseous effluent containing one or more olefin(s) within the disengaging vessel. Although cyclones are preferred, gravity effects within the disengaging vessel can also be used to separate the catalyst composition from the gaseous effluent. Other methods for separating the catalyst composition from the gaseous effluent include the use of plates, caps, elbows, and the like.

In one embodiment, the disengaging vessel includes a stripping zone, typically in a lower portion of the disengaging vessel. In the stripping zone the coked catalyst composition is contacted with a gas, preferably one or a combination of steam, methane, carbon dioxide, carbon monoxide, hydrogen, or an inert gas such as argon, preferably steam, to recover adsorbed hydrocarbons from the coked catalyst composition that is then introduced to the regeneration system.

The coked catalyst composition is withdrawn from the disengaging vessel and introduced to the regeneration system. The regeneration system comprises a regenerator where the coked catalyst composition is contacted with a regeneration medium, preferably a gas containing oxygen, under conventional regeneration conditions of temperature, pressure and residence time.

Non-limiting examples of suitable regeneration media include one or more of oxygen, $O_3$, $SO_3$, $N_2O$, NO, $NO_2$, $N_2O_5$, air, air diluted with nitrogen or carbon dioxide, oxygen and water (U.S. Pat. No. 6,245,703), carbon monoxide and/or hydrogen. Suitable regeneration conditions are those capable of burning coke from the coked catalyst composition, preferably to a level less than 0.5 weight percent based on the total weight of the coked molecular sieve catalyst composition entering the regeneration system. For example, the regeneration temperature may be in the range of from about 200° C. to about 1500° C., such as from about 300° C. to about 1000° C., for example from about 45° C. to about 750° C., and conveniently from about 550° C. to 700° C. The regeneration pressure may be in the range of from about 15 psia (103 kPaa) to about 500 psia (3448 kPaa), such as from about 20 psia (138 kpaa) to about 250 psia (1724 kPaa), including from about 25 psia (172 kPaa)

to about 150 psia (1034 kpaa), and conveniently from about 30 psia (207 kPaa) to about 60 psia (414 kPaa).

The residence time of the catalyst composition in the regenerator may be in the range of from about one minute to several hours, such as from about one minute to 100 minutes, and the volume of oxygen in the regeneration gas may be in the range of from about 0.01 mole percent to about 5 mole percent based on the total volume of the gas.

The burning of coke in the regeneration step is an exothermic reaction, and in an embodiment, the temperature within the regeneration system is controlled by various techniques in the art including feeding a cooled gas to the regenerator vessel, operated either in a batch, continuous, or semi-continuous mode, or a combination thereof. A preferred technique involves withdrawing the regenerated catalyst composition from the regeneration system and passing it through a catalyst cooler to form a cooled regenerated catalyst composition. The catalyst cooler, in an embodiment, is a heat exchanger that is located either internal or external to the regeneration system. Other methods for operating a regeneration system are in disclosed U.S. Pat. No. 6,290,916 (controlling moisture), which is herein fully incorporated by reference.

The regenerated catalyst composition withdrawn from the regeneration system, preferably from the catalyst cooler, is combined with a fresh molecular sieve catalyst composition and/or re-circulated molecular sieve catalyst composition and/or feedstock and/or fresh gas or liquids, and returned to the riser reactor(s). In one embodiment, the regenerated catalyst composition withdrawn from the regeneration system is returned to the riser reactor(s) directly, preferably after passing through a catalyst cooler. A carrier, such as an inert gas, feedstock vapor, steam or the like, may be used, semi-continuously or continuously, to facilitate the introduction of the regenerated catalyst composition to the reactor system, preferably to the one or more riser reactor(s).

By controlling the flow of the regenerated catalyst composition or cooled regenerated catalyst composition from the regeneration system to the reactor system, the optimum level of coke on the molecular sieve catalyst composition entering the reactor is maintained. There are many techniques for controlling the flow of a catalyst composition described in Michael Louge, *Experimental Techniques, Circulating Fluidized Beds*, Grace, Avidan and Knowlton, eds., Blackie, 1997 (336–337), which is herein incorporated by reference.

Coke levels on the catalyst composition are measured by withdrawing the catalyst composition from the conversion process and determining its carbon content. Typical levels of coke on the molecular sieve catalyst composition, after regeneration, are in the range of from 0.01 weight percent to about 15 weight percent, such as from about 0.1 weight percent to about 10 weight percent, for example from about 0.2 weight percent to about 5 weight percent, and conveniently from about 0.3 weight percent to about 2 weight percent based on the weight of the molecular sieve.

The gaseous effluent is withdrawn from the disengaging system and is passed through a recovery system. There are many well known recovery systems, techniques and sequences that are useful in separating olefin(s) and purifying olefin(s) from the gaseous effluent. Recovery systems generally comprise one or more or a combination of various separation, fractionation and/or distillation towers, columns, splitters, or trains, reaction systems such as ethylbenzene manufacture (U.S. Pat. No. 5,476,978) and other derivative processes such as aldehydes, ketones and ester manufacture (U.S. Pat. No. 5,675,041), and other associated equipment, for example various condensers, heat exchangers, refrigeration systems or chill trains, compressors, knock-out drums or pots, pumps, and the like.

Non-limiting examples of these towers, columns, splitters or trains used alone or in combination include one or more of a demethanizer, preferably a high temperature demethanizer, a dethanizer, a depropanizer, a wash tower often referred to as a caustic wash tower and/or quench tower, absorbers, adsorbers, membranes, ethylene (C2) splitter, propylene (C3) splitter and butene (C4) splitter.

Various recovery systems useful for recovering olefin(s), such as ethylene, propylene and/or butene, are described in U.S. Pat. No. 5,960,643 (secondary rich ethylene stream), U.S. Pat. Nos. 5,019,143, 5,452,581 and 5,082,481 (membrane separations), U.S. Pat. No. 5,672,197 (pressure dependent adsorbents), U.S. Pat. No. 6,069,288 (hydrogen removal), U.S. Pat. No. 5,904,880 (recovered methanol to hydrogen and carbon dioxide in one step), U.S. Pat. No. 5,927,063 (recovered methanol to gas turbine power plant), and U.S. Pat. No. 6,121,504 (direct product quench), U.S. Pat. No. 6,121,503 (high purity olefins without superfractionation), and U.S. Pat. No. 6,293,998 (pressure swing adsorption), which are all herein fully incorporated by reference.

Other recovery systems that include purification systems, for example for the purification of olefin(s), are described in *Kirk-Othmer Encyclopedia of Chemical Technology*, 4th Edition, Volume 9, John Wiley & Sons, 1996, pages 249–271 and 894–899, which is herein incorporated by reference. Purification systems are also described in for example, U.S. Pat. No. 6,271,428 (purification of a diolefin hydrocarbon stream), U.S. Pat. No. 6,293,999 (separating propylene from propane), and U.S. patent application Ser. No. 09/689,363 filed Oct. 20, 2000 (purge stream using hydrating catalyst), which are herein incorporated by reference.

Generally accompanying most recovery systems is the production, generation or accumulation of additional products, by-products and/or contaminants along with the preferred prime products. The preferred prime products, the light olefins, such as ethylene and propylene, are typically purified for use in derivative manufacturing processes such as polymerization processes. Therefore, in the most preferred embodiment of the recovery system, the recovery system also includes a purification system. For example, the light olefin(s) produced particularly in a MTO process are passed through a purification system that removes low levels of by-products or contaminants.

Non-limiting examples of contaminants and by-products include generally polar compounds such as water, alcohols, carboxylic acids, ethers, carbon oxides, sulfur compounds such as hydrogen sulfide, carbonyl sulfides and mercaptans, ammonia and other nitrogen compounds, arsine, phosphine and chlorides. Other contaminants or by-products include hydrogen and hydrocarbons such as acetylene, methyl acetylene, propadiene, butadiene and butyne.

Typically, in converting one or more oxygenates to olefin(s) having 2 or 3 carbon atoms, a minor amount hydrocarbons, particularly olefin(s), having 4 or more carbon atoms is also produced. The amount of $C_4+$ hydrocarbons is normally less than 20 weight percent, such as less than 10 weight percent, for example less than 5 weight percent, and particularly less than 2 weight percent, based on the total weight of the effluent gas withdrawn from the process, excluding water. Typically, therefore the recovery system may include one or more reaction systems for converting the $C_4+$ impurities to useful products.

Non-limiting examples of such reaction systems are described in U.S. Pat. No. 5,955,640 (converting a four carbon product into butene-1), U.S. Pat. No. 4,774,375 (isobutane and butene-2 oligomerized to an alkylate gasoline), U.S. Pat. No. 6,049,017 (dimerization of n-butylene), U.S. Pat. Nos. 4,287,369 and 5,763,678 (carbonylation or hydroformulation of higher olefins with carbon dioxide and hydrogen making carbonyl compounds), U.S. Pat. No. 4,542,252 (multistage adiabatic process), U.S. Pat. No. 5,634,354 (olefin-hydrogen recovery), and Cosyns, J. et al., *Process for Upgrading C3, C4 and C5 Olefinic Streams*, Pet. & Coal, Vol. 37, No. 4 (1995) (dimerizing or oligomerizing propylene, butylene and pentylene), which are all fully herein incorporated by reference.

The preferred light olefin(s) produced by any one of the processes described above are high purity prime olefin(s) products that contain a single carbon number olefin in an amount greater than 80 percent, such as greater than 90 weight percent, such as greater than 95 weight percent, for example at least about 99 weight percent, based on the total weight of the olefin.

In one practical embodiment, the process of the invention forms part of an integrated process for producing light olefin(s) from a hydrocarbon feedstock, preferably a gaseous hydrocarbon feedstock, particularly methane and/or ethane. The first step in the process is passing the gaseous feedstock, preferably in combination with a water stream, to a syngas production zone to produce a synthesis gas (syngas) stream, typically comprising carbon dioxide, carbon monoxide and hydrogen. Syngas production is well known, and typical syngas temperatures are in the range of from about 700° C. to about 1200° C. and syngas pressures are in the range of from about 2 MPa to about 100 MPa. Synthesis gas streams are produced from natural gas, petroleum liquids, and carbonaceous materials such as coal, recycled plastic, municipal waste or any other organic material. Preferably synthesis gas stream is produced via steam reforming of natural gas.

The next step in the process involves contacting the synthesis gas stream generally with a heterogeneous catalyst, typically a copper based catalyst, to produce an oxygenate containing stream, often in combination with water. In one embodiment, the contacting step is conducted at temperature in the range of from about 150° C. to about 450° C. and a pressure in the range of from about 5 MPa to about 10 MPa.

This oxygenate containing stream, or crude methanol, typically contains the alcohol product and various other components such as ethers, particularly dimethyl ether, ketones, aldehydes, dissolved gases such as hydrogen methane, carbon oxide and nitrogen, and fuel oil. The oxygenate containing stream, crude methanol, in the preferred embodiment is passed through a well known purification processes, distillation, separation and fractionation, resulting in a purified oxygenate containing stream, for example, commercial Grade A and AA methanol.

The oxygenate containing stream or purified oxygenate containing stream, optionally with one or more diluents, can then be used as a feedstock in a process to produce light olefin(s), such as ethylene and/or propylene. Non-limiting examples of this integrated process are described in EP-B-0 933 345, which is herein fully incorporated by reference.

In another more fully integrated process, that optionally is combined with the integrated processes described above, the olefin(s) produced are directed to, in one embodiment, one or more polymerization processes for producing various polyolefins. (See for example U.S. patent application Ser. No. 09/615,376 filed Jul. 13, 2000, which is herein fully incorporated by reference.)

Polymerization processes include solution, gas phase, slurry phase and a high pressure processes, or a combination thereof. Particularly preferred is a gas phase or a slurry phase polymerization of one or more olefin(s) at least one of which is ethylene or propylene. These polymerization processes utilize a polymerization catalyst that can include any one or a combination of the molecular sieve catalysts discussed above. However, the preferred polymerization catalysts are the Ziegler-Natta, Phillips-type, metallocene, metallocene-type and advanced polymerization catalysts, and mixtures thereof.

In a preferred embodiment, the integrated process comprises a process for polymerizing one or more olefin(s) in the presence of a polymerization catalyst system in a polymerization reactor to produce one or more polymer products, wherein the one or more olefin(s) have been made by converting an alcohol, particularly methanol, using a molecular sieve catalyst composition as described above. The preferred polymerization process is a gas phase polymerization process and at least one of the olefins(s) is either ethylene or propylene, and preferably the polymerization catalyst system is a supported metallocene catalyst system. In this embodiment, the supported metallocene catalyst system comprises a support, a metallocene or metallocene-type compound and an activator, preferably the activator is a non-coordinating anion or alumoxane, or combination thereof, and most preferably the activator is alumoxane.

The polymers produced by the polymerization processes described above include linear low density polyethylene, elastomers, plastomers, high density polyethylene, low density polyethylene, polypropylene and polypropylene copolymers. The propylene based polymers produced by the polymerization processes include atactic polypropylene, isotactic polypropylene, syndiotactic polypropylene, and propylene random, block or impact copolymers.

VI. EXAMPLES OF MOISTURE EFFECTS ON THE MOLECULAR SIEVES

Various embodiments of this invention are exemplified in the following examples:

Example 1

About 40 mg of catalyst particles were loaded into the sample cell of a microbalance (conventional thermal gravimetric analyzer, TGA). The catalyst was calcined with air at about 650° C. for more than 4 hours at atmospheric pressure, then cooled down under dry inert gas (containing no water) to the adsorption temperature. The inert gas flow rate was 150 scc/min (at standard conditions) and the pressure in the TGA was 119.7 psia. After a stable weight was established, water was injected into the dry inert gas at a control rate through a vaporizer. This provided a controlled steam flow rate (cc/min at standard condition). The inert gas flow was decreased by the same amount so that the total flow rate was kept at 150 scc/min. The partial pressure of steam in the gas mixture flowing to the catalyst was calculated as $$P = (\text{steam flow rate}/150)*119.7 \text{ psia}$$

When steam was added, the TGA recorded at first a fast increase in weight due to adsorption of water followed by a slower increase in weight as equilibrium adsorption was approached at the specified steam partial pressure and temperature. This adsorption was carried out for about 80 minutes to approach equilibrium adsorption. The weight increase, wt %, due to adsorption of water is calculated based on the dry weight of the catalyst, i.e., weight of the catalyst before steam is admitted to the TGA. Then the water injection rate was increased and equilibrium adsorption was achieved after about 80 minutes at this increased steam partial pressure. The water adsorption experiment was performed at various steam partial pressures to provide an adsorption isotherm as indicated by the data in the Table. The results are shown in the Table. Note that at 188° C., $P_o$=174.2 psia; at 212° C., $P_o$=287.9 psia; at 216° C., $P_o$=311.4 psia; and at 315° C., $P_o$=1,532.1 psia.

TABLE

| Ads. | | Relative pressure (P/P$_o$) and amount of water adsorbed (wt. %) at indicated water partial pressures (psia) | | | | | | | |
|---|---|---|---|---|---|---|---|---|---|
| T (° C.) | | 25.4 (psia) | 26.9 (psia) | 34.9 (psia) | 38.6 (psia) | 45.3 (psia) | 50.0 (psia) | 60.5 (psia) | 61.5 (psia) | 67.7 (psia) |
| 188 | P/P$_o$ | | | | 0.222 | | 0.287 | | 0.353 | 0.389 |
| 188 | wt. % | | | | 6.44 | | 8.78 | | 10.69 | 11.33 |
| 212 | P/P$_o$ | | 0.093 | | 0.134 | | 0.174 | | 0.214 | 0.235 |
| 212 | wt. % | | 3.55 | | 4.59 | | 5.53 | | 6.75 | 7.38 |
| 216 | P/P$_o$ | 0.082 | | 0.112 | | 0.145 | | 0.194 | | |
| 216 | wt. % | 2.79 | | 3.78 | | 4.85 | | 5.71 | | |
| 322 | P | 22.9 | | | | | | | | |
| 322 | wt. % | 0 | | | | | | | | |
| 450 | wt. % | 0 | | | | 0 | | | | 0 |
| 650 | wt. % | 0 | | | | | | | | |

The data in the Table indicate that contacting activated SAPO-34 molecular sieve catalyst with a gas at a relative water pressure of 0.082 or greater and a temperature of 216° C. or less results in substantial water adsorption by the activated catalyst. This water adsorption is considered to result in a substantial loss in catalytic activity.

Example 2

About 40 mg of catalyst particles were loaded into the sample cell of a microbalance (traditional thermal gravimetric analyzer, TGA). The catalyst was calcined with air at about 650° C. for more than 4 hours at atmospheric pressure, then was cooled down under dry inert gas (containing no water) to the adsorption temperature, 180–184° C. The inert gas flow rate was 150 scc/min (at standard condition) and the pressure in the TGA was 119.7 psia. After a stable weight was established, water was injected into the dry inert gas at a control rate through a vaporizer. This provided a controlled steam flow rate (cc/min at standard condition). The inert gas flow was decreased by the same amount so that the total flow rate was kept at 150 scc/min. The partial pressure of steam in the gas mixture flowing to the catalyst was calculated as $$P=(\text{steam flow rate}/150)119.7 \text{ psia}$$

When steam was added to give 25.3 psia steam partial pressure as indicated in the FIGURE, the TGA recorded at first a fast increase in weight due to adsorption of water, followed by a slower increase as equilibrium adsorption was approached at the specified steam partial pressure (Pt. 1). This adsorption was carried out for about 80 minutes to approach equilibrium adsorption. The weight increase, wt %, due to adsorption of water is calculated based on the dry weight of the catalyst, i.e., weight of the catalyst before steam is admitted to the TGA. Then the water injection rate was increased to provide a steam partial pressure of 49.9 psia and equilibrium adsorption was achieved after about 80 minutes (Pt. 2). A further increase in steam partial pressure to 69.7 psia showed a further increase in weight of the catalyst, due to additional water adsorption (Pt. 3). The FIGURE shows that when water injection was stopped and only dry inert gas was flowing at 150 scc/min, most of the adsorbed water was removed from the catalyst. However, there was still 1.6 wt % of water remaining even after a dry gas purge for 100 minutes at 182° C. (Pt. 4). In a second step drying experiment, the catalyst sample was further heated to 284° C. in dry gas for about 120 minutes. Since an accurate comparison of weights at 284° C. and 182° C. cannot be accurately compared due to different degrees of buoyancy, the sample was cooled back to 182° C. in order to complete the measure of the desorption of water. The FIGURE shows that after treatment at 284° C., the adsorbed water can be completely removed (Pt. 5).

Having now fully described this invention, it will be appreciated by those skilled in the art that the invention can be performed within a wide range of parameters, without departing from the spirit and scope of the invention.

What is claimed is:

1. A method of protecting activated metalloaluminophosphate molecular sieve from catalytic deactivation due to contact with water, the method comprising the steps of:
   a) providing a metalloaluminophosphate molecular sieve having a template therein;
   b) heating the metalloaluminophosphate molecular sieve to remove the template and form an activated metalloaluminophosphate molecular sieve baying a water content of not greater than 1.25 wt %, based on total weight of the activated metalloaluminophosphate molecular sieve.

2. The method of claim 1, wherein the provided metalloaluminophosphate molecular sieve is heated to remove the template and form an activated metalloaluminophosphate molecular sieve having a water content of not greater than 1.0 wt %, based on total weight of the activated metalloaluminophosphate molecular sieve.

3. The method of claim 2, wherein the provided metalloaluminophosphate molecular sieve is heated to remove the template and form an activated metalloaluminophosphate molecular sieve having a water content of not greater than 0.8 wt %, based on total weight of the activated metalloaluminophosphate molecular sieve.

4. The method of claim 3, wherein the provided metalloaluminophosphate molecular sieve is heated to remove the template and form an activated metalloaluminophosphate molecular sieve having a water content of not greater than 0.5 wt %, based on total weight of the activated metalloaluminophosphate molecular sieve.

5. The method of claim 1, wherein the provided metalloaluminophosphate molecular sieve is heated by calcining and then cooled by contacting with a gas in an environment having a temperature of at least 225° C.

6. The method of claim 5, wherein the provided metalloaluminophosphate molecular sieve is heated by calcining and then cooled by contacting with a gas in an environment having a temperature of at least 250° C.

7. The method of claim 6, wherein the provided metalloaluminophosphate molecular sieve is heated by calcining and then cooled by contacting with a gas in an environment having a temperature of at least 275° C.

8. The method of claim 7, wherein the provided metalloaluminophosphate molecular sieve is heated by calcining and then cooled by contacting with a gas in an environment having a temperature of at least 300° C.

9. The method of claim 8, wherein the provided metalloaluminophosphate molecular sieve is heated by calcining and then cooled by contacting with a gas in an environment having a temperature of at least 340° C.

10. The method of claim 5, 6, 7, 8 or 9, wherein the gas is air, nitrogen, helium, flue gas, or any combination thereof.

11. The method of claim 10, wherein the environment has a relative water pressure of not greater than 0.075.

12. The method of claim 11, wherein the environment has a relative water pressure of not greater than 0.05.

13. The method of claim 12, wherein the environment has a relative water pressure of not greater than 0.025.

14. The method of claim 13, wherein the environment has a relative water pressure of not greater than 0.001.

15. The method of claim 1, wherein the metalloaluminophosphate molecular sieve is SAPO molecular sieve.

16. The method of claim 1, wherein heating the metalloaluminophosphate molecular sieve to remove the template and activate the metalloaluminophosphate molecular sieve is carried out in one or more vessels.

17. A method of activating and drying metalloaluminophosphate molecular sieve, the method comprising the steps of:
   a) providing a metalloaluminophosphate molecular sieve having a template therein;
   b) removing the template from the metalloaluminophosphate molecular sieve to activate the metalloaluminophosphate molecular sieve; and
   c) drying the activated metalloaluminophosphate molecular sieve to form an activated metalloaluminophosphate molecular sieve baying a water content of not greater than 1.25 wt %, based on total weight of the activated metalloaluminophosphate molecular sieve.

18. The method of claim 17, wherein the activated metalloaluminophosphate molecular sieve is dried to form an activated metalloaluminophosphate molecular sieve having a water content of not greater than 1.0 wt %, based on total weight of the activated metalloaluminophosphate molecular sieve.

19. The method of claim 18, wherein the activated metalloaluminophosphate molecular sieve is dried to form an activated metalloaluminophosphate molecular sieve having a water content of not greater than 0.8 wt %, based on total weight of the activated metalloaluminophosphate molecular sieve.

20. The method of claim 19, wherein the activated metalloaluminophosphate molecular sieve is dried to form an activated metalloaluminophosphate molecular sieve having a water content of not greater than 0.5 wt %, based on total weight of the activated metalloaluminophosphate molecular sieve.

21. The method of claim 17, wherein the template is removed from the metalloaluminophosphate molecular sieve by contacting with a gas containing water vapor.

22. The method of claim 17, wherein the metalloaluminophosphate molecular sieve is SAPO molecular sieve.

23. The method of claim 17, wherein the template is selected from the group consisting of tetraethyl ammonium salts, cyclopentylamine, aminomethyl cyclohexane, piperidine, triethylamine, cyclohexylamine, tri-ethyl hydroxyethylamine, morpholine, dipropylamine (DPA), pyridine, isopropylamine, heated degraded forms thereof, and combinations thereof.

24. The method of claim 17, wherein the activated metalloaluminophosphate molecular sieve is dried by contacting with a gas in an environment having a relative water pressure of not greater than 0.075.

25. The method of claim 24, wherein the activated metalloaluminophosphate molecular sieve is dried by contacting with a gas in an environment having a relative water pressure of not greater than 0.05.

26. The method of claim 25, wherein the activated metalloaluminophosphate molecular sieve is dried by contacting with a gas in an environment having a relative water pressure of not greater than 0.025.

27. The method of claim 26, wherein the activated metalloaluminophosphate molecular sieve is dried by contacting with a gas in an environment having a relative water pressure of not greater than 0.001.

28. The method of claim 17, wherein the template is removed by calcining with steam and the activated metalloaluminophosphate molecular sieve is dried by contacting with a gas at a temperature of at least 225° C.

29. The method of claim 28, wherein the template is removed by calcining with steam and the activated metalloaluminophosphate molecular sieve is dried by contacting with a gas at a temperature of at least 250° C.

30. The method of claim 29, wherein the template is removed by calcining with steam and the activated metalloaluminophosphate molecular sieve is dried by contacting with a gas at a temperature of at least 275° C.

31. The method of claim 30, wherein the template is removed by calcining with steam and the activated metalloaluminophosphate molecular sieve is dried by contacting with a gas at a temperature of at least 300° C.

32. The method of claim 31, wherein the template is removed by calcining with steam and the activated metalloaluminophosphate molecular sieve is dried by contacting with a gas at a temperature of at least 340° C.

33. The method of claim 17, wherein removing the template from the metalloaluminophosphate molecular sieve to activate the metalloaluminophosphate molecular sieve, and drying the activated metalloaluminophosphate molecular sieve is carried out in one or more vessels.

34. A method of activating and drying metalloaluminophosphate molecular sieve, the method comprising the step of:
   a) providing a metalloaluminophosphate molecular sieve having a template therein;
   b) heating the metalloaluminophosphate molecular sieve with steam at a temperature effective to remove the template and activate the metalloaluminophosphate molecular sieve; and
   c) contacting the activated metalloaluminophosphate molecular sieve with a gas in an environment at conditions effective to form a metalloaluminophosphate molecular sieve having a water content of not greater than 1.25 wt %, based on total weight of the metalloaluminophosphate molecular sieve.

35. The method of claim 34, wherein the activated metalloaluminophosphate molecular sieve is contacted with a gas in an environment at conditions effective to form a metalloaluminophosphate molecular sieve having a water content of not greater than 1.0 wt %, based on total weight of the metalloaluminophosphate molecular sieve.

36. The method of claim 35, wherein the activated metalloaluminophosphate molecular sieve is contacted with a gas in an environment at conditions effective to form a metalloaluminophosphate molecular sieve having a water content of not greater than 0.8 wt %, based on total weight of the metalloaluminophosphate molecular sieve.

37. The method of claim 36, wherein the motivated metalloaluminophosphate molecular sieve is contacted with a gas in an environment at conditions effective to form a metalloaluminophosphate molecular sieve having a water content of not greater than 0.5 wt %, based on total weight of the metalloaluminophosphate molecular sieve.

38. The method of claim 34, wherein the metalloaluminophosphate molecular sieve is SAPO molecular sieve.

39. The method of claim 34, wherein heating the metalloaluminophosphate molecular sieve with steam to remove the template and activate the metalloaluminophosphate molecular sieve, and contacting the activated metalloaluminophosphate molecular sieve with a gas is carried out in one or more vessels.

40. A method of making activated metalloaluminophosphate molecular sieve, the method comprising the steps of:
a) providing a metalloaluminophosphate molecular sieve having a template therein;
b) contacting the metalloaluminophosphate molecular sieve with a gas at conditions effective to remove the template and activate the metalloaluminophosphate molecular sieve; a) cooling the activated metalloaluminophosphate molecular sieve to a temperature lower than that of the gas used to contact the metalloaluminophosphate molecular sieve in step b), with the temperature effective to form an activated metalloaluminophosphate molecular sieve having a water content of not greater than 1.25 wt %, based on total weight of the activated metalloaluminophosphate molecular sieve.

41. The method of claim 40, wherein the temperature is effective to form an activated metalloaluminophosphate molecular sieve having a water content of not greater than 1.0 wt %, based on total weight of the activated metalloaluminophosphate molecular sieve.

42. The method of claim 41, wherein the temperature is effective to form an activated metalloaluminophosphate molecular sieve having a water content of not greater than 0.8 wt %, based on total weight of the activated metalloaluminophosphate molecular sieve.

43. The method of claim 42, wherein the temperature is effective to form an activated metalloaluminophosphate molecular sieve having a water content of not greater than 0.5 wt %, based on total weight of the activated metalloaluminophosphate molecular sieve.

44. The method of claim 40, wherein the activated metalloaluminophosphate molecular sieve is cooled to a temperature that is at least 50° C. lower than th used to contact the metalloaluminophosphate molecular sieve in step b).

45. The method of claim 44, wherein the activated metalloaluminophosphate molecular sieve is cooled to a temperature that is at least 100° C. lower than that of the gas used to contact the metalloaluminophosphate molecular sieve in step b).

46. The method of claim 45, wherein the activated metalloaluminophosphate molecular sieve is cooled to a temperature that is at least 150° C. lower than that of the gas used to contact the metalloaluminophosphate molecular sieve in step b).

47. The method of claim 46, wherein the activated metalloaluminophosphate molecular sieve is cooled to a temperature that is at least 200° C. lower than that of the gas used to contact the metalloaluminophosphate molecular sieve in step b).

48. The method of claim 40, wherein the metalloaluminophosphate molecular sieve is SAPO molecular sieve.

49. The method of claim 40, wherein contacting the metalloaluminophosphate molecular sieve with a gas to remove the template and activate the metalloaluminophosphate molecular sieve, and cooling the activated metalloaluminophosphate molecular sieve is carried out in one or more vessels.

50. A method of making a formulated metalloaluminophosphate molecular sieve catalyst, the method comprising the steps of:
a) mixing together metalloaluminophosphate molecular sieve, matrix material, and a binder to form a slurry
b) removing water from the slurry to form a preformed metalloaluminophosphate molecular sieve catalyst;
c) contacting the preformed metalloaluminophosphate molecular sieve catalyst with a gas to form an activated metalloaluminophosphate molecular sieve catalyst; and
d) drying the activated metalloaluminophosphate molecular sieve catalyst to a water content of not greater than 1.25 wt %, based on total weight of the activated metalloaluminophosphate molecular sieve catalyst.

51. The method of claim 50, wherein the activated metalloaluminophosphate molecular sieve catalyst is dried to form an activated metalloaluminophosphate molecular sieve catalyst having a water content of not greater than 1.0 wt %, based on total weight of the activated metalloaluminophosphate molecular sieve catalyst.

52. The method of claim 51, wherein the activated metalloaluminophosphate molecular sieve catalyst is dried to form an activated metalloaluminophosphate molecular sieve catalyst having a water content of not greater than 0.8 wt %, based on total weight of the activated metalloaluminophosphate molecular sieve catalyst.

53. The method of claim 52, wherein the activated metalloaluminophosphate molecular sieve catalyst is dried to form an activated metalloaluminophosphate molecular sieve catalyst having a water content of not greater than 0.5 wt %, based on total weight of the activated metalloaluminophosphate molecular sieve catalyst.

54. The method of claim 50, wherein the metalloaluminophosphate molecular sieve is SAPO molecular sieve.

55. The method of claim 50, wherein the contacting of the preformed metalloaluminophosphate molecular sieve catalyst and the drying of the activated metalloaluminophosphate molecular sieve catalyst is carried out in one or more vessels.

56. A method of storing activated metalloaluminophosphate molecular sieve, the method comprising the steps of:
a) providing a metalloaluminophosphate molecular sieve having template therein;
b) contacting the metalloaluminophosphate molecular sieve with a gas containing water vapor at conditions effective to remove the template and activate the metalloaluminophosphate molecular sieve; and
c) contacting the activated metalloaluminophosphate molecular sieve with a gas at conditions effective to form an activated catalyst having a water content of not greater than 1.25 wt %, based on total weight of the activated metalloaluminophosphate molecular sieve; and
d) storing the contacted metalloaluminophosphate molecular sieve of step c) in an anhydrous environment.

57. The method of claim 56, wherein the activated metalloaluminophosphate molecular sieve of step c) is contacted with a gas at conditions effective to form an activated metalloaluminophosphate molecular sieve having a water content of not greater than 1.0 wt %, based on total weight of the activated metalloaluminophosphate molecular sieve.

58. The method of claim 57, wherein the activated metalloaluminophosphate molecular sieve of step c) is contacted with a gas at conditions effective to form an activated metalloaluminophosphate molecular sieve having a water content of not greater than 0.8 wt %, based on total weight of the activated metalloaluminophosphate molecular sieve.

59. The method of claim 58, wherein the activated metalloaluminophosphate molecular sieve of step c) is contacted with a gas at conditions effective to form an activated metalloaluminophosphate molecular sieve having a water content of not greater than 0.5 wt %, based on total weight of the activated metalloaluminophosphate molecular sieve.

60. The method of claim 56, wherein the metalloaluminophosphate molecular sieve is SAPO molecular sieve.

61. The method of claim 56, wherein the contacting of the activated metalloaluminophosphate molecular sieve catalyst with a gas is carried out in one or more vessels.

62. A method of storing activated metalloaluminophosphate molecular sieve, the method comprising the steps of:
   a) providing a metalloaluminophosphate molecular sieve having template therein;
   b) contacting the metalloaluminophosphate molecular sieve with a gas containing water vapor at conditions effective to remove the template and activate the metalloaluminophosphate molecular sieve; and
   c) contacting the activated metalloaluminophosphate molecular sieve with a gas at conditions effective to form an activated catalyst having a water content of not greater than 1.25 wt %, based on total weight of the activated metalloaluminophosphate molecular sieve; and
   d) storing the contacted activated metalloaluminophosphate molecular sieve of step c) at a temperature of at least 150° C.

63. The method of claim 62, wherein the activated metalloaluminophosphate molecular sieve of step c) is contacted with a gas at conditions effective to form an activated metalloaluminophosphate molecular sieve having a water content of not greater than 1.0 wt %, based on total weight of the activated metalloaluminophosphate molecular sieve.

64. The method of claim 63, wherein the activated metalloaluminophosphate molecular sieve of step c) is contacted with a gas at conditions effective to form an activated metalloaluminophosphate molecular sieve having a water content of not greater than 0.8 wt %, based on total weight of the activated metalloaluminophosphate molecular sieve.

65. The method of claim 64, wherein the activated metalloaluminophosphate molecular sieve of step c) is contacted with a gas at conditions effective to form an activated metalloaluminophosphate molecular sieve having a water content of not greater than 0.5 wt %, based on total weight of the activated metalloaluminophosphate molecular sieve.

66. The method of claim 62, wherein the metalloaluminophosphate molecular sieve is SAPO molecular sieve.

67. The method of claim 62, wherein contacting the activated metalloaluminophosphate molecular sieve with a gas is carried out in one or more vessels.

68. The method of claim 34 wherein the contacting step of c) occurs in an environment having a relative water pressure not greater than about 0.075.

69. The method of claim 40 wherein the cooling step of c) occurs in an environment having a relative water pressure not greater than about 0.075.

70. The method of claim 56 wherein the contacting step of c) occurs in an environment having a relative water pressure not greater than about 0.075.

71. The method of claim 62 wherein the contacting step of c) occurs in an environment having a relative water pressure not greater than about 0.075.

72. The method of claim 50, wherein the gas comprises air, steam, or any combination thereof.

73. The method of claim 50, wherein the activated metalloaluminophosphate molecular sieve catalyst is cooled by contacting with a dry gas in an environment having a temperature of at least 225° C.

74. The method of claim 73, wherein the dry gas is air, nitrogen, helium, flue gas, or any combination thereof.

75. The method of claim 74, wherein the environment has a relative water pressure of not greater than 0.075.

* * * * *

UNITED STATES PATENT AND TRADEMARK OFFICE
CERTIFICATE OF CORRECTION

PATENT NO.     : 6,897,179 B2
DATED          : May 24, 2005
INVENTOR(S)    : Shun Chong Fung et al.

Page 1 of 1

It is certified that error appears in the above-identified patent and that said Letters Patent is hereby corrected as shown below:

Column 26,
Line 42, replace the word "baying" with -- having --.

Signed and Sealed this

Ninth Day of August, 2005

JON W. DUDAS
*Director of the United States Patent and Trademark Office*